March 19, 1940. N. TESTI 2,193,909
SHAVING IMPLEMENT
Filed Jan. 19, 1937
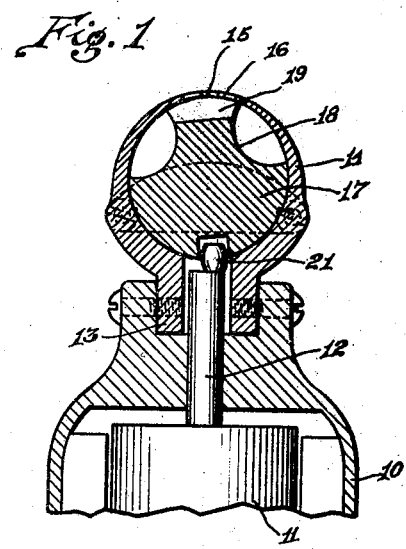
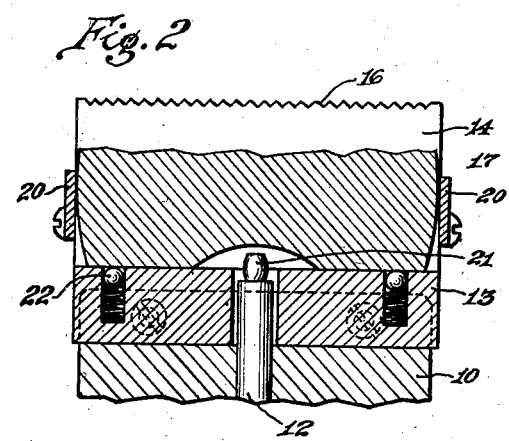
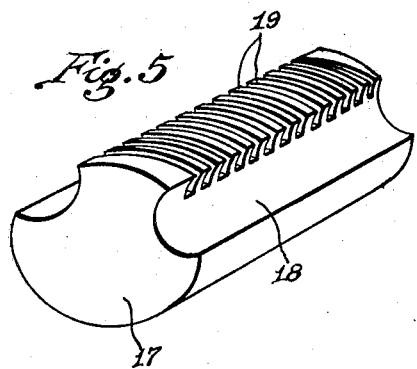
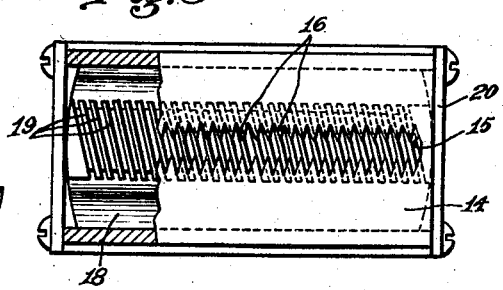
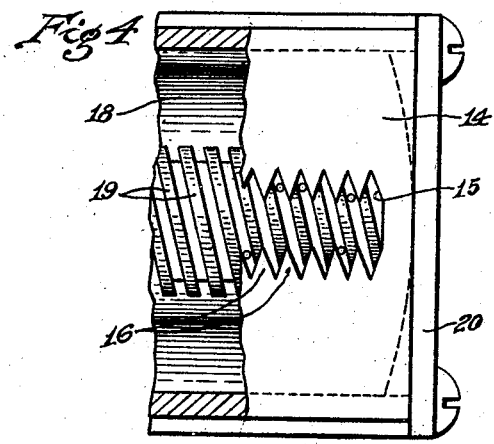
INVENTOR
Nicholas Testi
BY
ATTORNEY Patented Mar. 19, 1940

2,193,909

UNITED STATES PATENT OFFICE 2,193,909

SHAVING IMPLEMENT

Nicholas Testi, Boston, Mass., assignor to Gillette Safety Razor Company, Boston, Mass., a corporation of Delaware Application January 19, 1937, Serial No. 121,320

1 Claim. (Cl. 30—43)

This invention relates to dry-shaving implements having co-operating shearing elements, one driven with respect to the other to effect a shaving operation. In general the object of the invention is to improve such implements in respect to efficiency and closeness of shaving and in their mechanical construction with a view to reducing the cost of manufacture and increasing their useful life as compared to dry-shaving implements heretofore available.

An important feature of the invention consists in a guard member having teeth with transversely disposed shearing edges, in combination with an oscillating or rocking cutter held against endwise movement and having teeth disposed obliquely or spirally therein. In the implement of my invention, therefore, the shearing travel of the teeth of the cutter is due to their spiral or inclined disposition in a rocking or oscillatory cutter and not to any longitudinal travel of the cutter. Preferably and as herein shown the teeth of the guard are inwardly directed and each has a wide, strong base and a narrow apex. These teeth are, therefore, durable and not liable to flex and yet may be made extremely thin so that close shaving results from the use of the implement.

The guard may comprise a cylindrical body portion apertured longitudinally in one side wall and the stationary shear teeth may be formed by serrating the edges of the aperture. The cylindrical portion of the guard may also be utilized as a bearing in which the cutter is journaled. The cutter itself may comprise an elongated member having a sufficiently complete cylindrical surface to control its position in the cylindrical bearing thus provided. Preferably and as herein shown the cutter is provided with longitudinal grooves at either side of the shearing teeth and in these grooves the shaving debris may be collected and subsequently ejected without danger of clogging the moving parts of the implement.

These and other features of the invention will be best understood and appreciated from the following description of a preferred embodiment thereof, selected for purposes of illustration and shown in the accompanying drawing, in which:

Fig. 1 is a cross-sectional view of the apparatus on an enlarged scale, a portion of the housing being shown as broken away;

Fig. 2 is a similar view in longitudinal section;

Fig. 3 is a plan view of the implement, a portion of the guard plate being shown as broken away;

Fig. 4 is a similar view on a still larger scale; and

Fig. 5 is a view in perspective of the cutter member on the scale of Fig. 1.

The illustrated implement includes in its structure a casing 10 of "Bakelite" or other mouldable product, which is shaped to serve as a handle and also as a housing enclosing the small electric motor which drives the cutter, the rotor 11 and the motor shaft 12 being shown in Fig. 1. The housing 10 is provided at its upper end with a socket for the guard member of the implement and that member comprises a lower elongated flanged portion 13 and an upper hollow cylindrical portion 14. The guard member is retained in position in the housing 10 by suitable screws passing through the housing and threaded into its flange portion 13.

The cylindrical body portion 14 of the guard member is elongated in the direction of its major axis and provided with an eccentric longitudinal bore which reduces the upper part of the cylindrical wall to a thickness of .004" to .006" or thereabouts. In this reduced portion of the wall is formed an elongated aperture or slot 15 having its opposite longitudinal edges serrated to present transversely extending V-shaped shearing teeth 16. These teeth as shown in Figs. 3 and 4 are arranged in symmetrical relation, that is to say, the points of the teeth on one side of the aperture 15 are located opposite to the points of the teeth on the other side of the aperture, the points of both series of teeth extending inwardly toward the median line of the aperture 15.

Within the cylindrical bore of the portion 14 of the guard member is mounted a cutter 17 of substantially the same length as the guard member and having therein a lower cylindrical portion which is concentric with the surface of the bore and slides therein. The cutter is substantially the same length as the guard member and provided on each side with a deep longitudinal groove 18 concave in cross-section. The two grooves 18 define or bound an upwardly extending cylindrical portion of the cutter and in this is formed a series of oblique or inclined shearing teeth 19 disposed in parallel relation and transversely to the axis of the cutter. These teeth 19 are the equivalent of a square spiral thread cut in the upper cylindrical face of the cutter and in the assembled implement they may be double-acting, that is to say, the opposite sides of each tooth may act in axial shearing in the forward and reverse oscillation respective of the cutter. The cutter is held against longitudinal movement and maintained in place within the guard member by end plates 20 which extend across the open ends of the bore in the guard member. A short longitudinal slot is formed in the bottom face of the cutter for the reception of an eccentric head 21 which is fast upon or formed integral with a motor shaft 12.

Accordingly, when the motor is operated a transverse oscillatory movement is imparted to the cutter at a high rate of speed. A pair of sockets is provided in the flange portion 13 of the guard member and in these sockets are arranged spring-pressed balls 22 which act at all times to press the cutter into yielding engagement with the upper face of the guard member so that the shearing teeth 19 thereof are maintained in shearing engagement with the teeth 16 of the guard member.

In operation, the motor is started and the apertured face of the guard member 14 is moved transversely by the user across his face. The hairs thereupon enter the aperture 15 and as the implement is advanced they find their way into the recesses between the V-shaped shearing teeth 16 as suggested in Fig. 4. Meanwhile the cutter 17 is maintained in rapid oscillation and the relation of the teeth 19 thereof to the stationary teeth 16 of the guard member is such that when the cutter is oscillated in one direction the right-hand shearing edge of the teeth 19, as shown in Fig. 4, engages and shears the hairs which have entered the spaces between the V-shaped teeth 16 in the upper side of the aperture 15 against the left-hand edge of the stationary teeth. When the cutter is oscillated in the other direction the hairs entering the spaces between the shearing teeth 16 at the lower side of the aperture 15 are sheared by the left-hand edges of the teeth 19 acting against the right-hand edges of the shearing teeth 16. In effect, therefore, the shearing teeth of the cutter move longitudinally and the shearing operation is effected by the relative axial movement of the transversely disposed shearing edges.

The entrance of the hairs to shearing position is facilitated by the pointed configuration of the stationary shearing teeth 16 which bring about a comb-like action. The wide base of the teeth, further permits the employment of thin material in the guard and so improves the close shaving of the implement. The hairs as severed drop down into the spaces supplied by the longitudinal grooves 18 of the cutter member 17 and are at all times free to pass out through the end faces of the guard member. These, as shown in Fig. 1, are entirely unobstructed in the area opposite the ends of the grooves. During the operation of the implement a firm degree of shearing pressure between the teeth is maintained by the spring-pressed balls 22, already mentioned, acting against the bottom of the cutter.

Having thus disclosed my invention and described one embodiment thereof by way of illustration and not limitation, what I claim as new and desire to secure by Letters Patent is:

A dry shaving implement comprising a cylindrical housing apertured in its side wall to present two spaced longitudinal series of V-shaped shearing teeth, and a cylindrical cutter having parallel grooves in its side walls defining a section which is obliquely and transversely slotted to present a series of inclined shearing teeth, the grooves providing debris-receiving openings along both sides of said series of inclined teeth and the cutter being held against longitudinal movement in the housing, and means for oscillating the cutter to advance its teeth in spiral co-operative shearing relation with respect to the teeth of the housing.

NICHOLAS TESTI.